US009881495B1

(12) United States Patent
Da Canal et al.

(10) Patent No.: US 9,881,495 B1

(45) Date of Patent: Jan. 30, 2018

(54) DUPLICATION METHOD FOR A REMOTE CONTROL OPERATING IN RADIO FREQUENCY AND REMOTE CONTROL THUS OBTAINED

(71) Applicant: SICE TECH S.R.L., Brescia (IT)

(72) Inventors: Luca Da Canal, Spilimbergo (IT); Michele Romano, San Pietro di Feletto (IT)

(73) Assignee: SICE TECH S.R.L., Brescia (IT)

( * ) Notice: Subject to any disclaimer, the term of this patent is extended or adjusted under 35 U.S.C. 154(b) by 0 days.

(21) Appl. No.: 15/335,285

(22) Filed: Oct. 26, 2016

(51) Int. Cl.
*G05B 11/01* (2006.01)
*G08C 17/02* (2006.01)

(52) U.S. Cl.
CPC ......... *G08C 17/02* (2013.01); *G08C 2201/20* (2013.01)

(58) Field of Classification Search
CPC ............................ G08C 17/02; G08C 2201/20
USPC ....................................................... 340/12.28
See application file for complete search history.

(56) References Cited

U.S. PATENT DOCUMENTS 7,345,700 B2 * 3/2008 Nortrup .................. H01L 33/32 348/180
9,037,980 B2 * 5/2015 Gastaldi ................. G06Q 10/10 715/753
2009/0045920 A1 * 2/2009 McQuaide, Jr. ....... G08C 19/28 340/10.2
2017/0142249 A1 * 5/2017 Shinar ............... H04M 1/72533

* cited by examiner

*Primary Examiner* — Tanmay Shah
(74) *Attorney, Agent, or Firm* — Hickman Palermo Becker Bingham LLP

(57) ABSTRACT

In one embodiment, a duplication method is provided for a remote control operating in radio frequency and capable to remotely control an electrical device by the pressure of at least one control key or button. The remote control comprises at least one memory, a transceiver and a microprocessor capable of executing a program for implementing: enabling the clone remote control to a duplication phase by pressing said control key and simultaneously pressing a programming key for a predetermined number of times; releasing the said control and programming keys; approaching the emitting ends of an original remote to be duplicated and the clone remote control in the duplication phase; pressing for a predetermined period of time a key of the original remote control, allowing said microprocessor to receive via the transceiver the working frequency and the code transmitted from the original remote control by means of a recognition and/or emulation procedure of the transmitted code; pressing for a predetermined period of time a key of the clone remote control to which assign the same function of said key of the original remote control; storing in said memory said working frequency, the recognized code and the assigned key; starting a control procedure that provides for the transmission of the recognized or emulated code toward the electrical device to be controlled; confirming the storage of said recognized or emulated code also on the electrical device to be controlled, if the control procedure has succeeded.

19 Claims, 4 Drawing Sheets

DUPLICATION METHOD FOR A REMOTE CONTROL OPERATING IN RADIO FREQUENCY AND REMOTE CONTROL THUS OBTAINED

BACKGROUND

Technical Field

The present disclosure refers to a duplication method for a remote control operating in radio frequency and to a remote control obtained according to said method.

More particularly, but not exclusively, the disclosure concerns a duplication method for a remote control operating in radio frequency and capable of remotely control an electrical device by pressing at least one control key or button; said remote control including at least one memory, a transceiver and a microprocessor capable to execute a program.

Known Art

As it is well known in this specific technical sector, a remote control is an electronic device that allows sending signals to another remotely placed device being controllable by means of those signals. The remote control is a portable object having small dimensions, being battery operated and structured in order to being able to be easily kept and activated also with a single hand.

The most common remote controls in the domestic field are intended for opening and closing doors and gates or for controlling lighting systems.

A remote control is capable to emit electromagnetic signals that are picked up by the remotely controlled device by means of a dedicated receiver. For short-range remote controls, infrared signals are used, while for longer distances, the radio waves are used and in that case, they are called radio remote controls.

There are also remote controls in the domestic field, which are defined as "universal" meaning that they have the peculiarity to be set in order to control a plurality of electrical devices such as a music center, a television and/or other apparatuses being present in the domestic field.

In this field, often it is needed to quickly duplicate a remote control without necessarily having to turn to skilled or professional staff.

However, for this purpose it is necessary to have available an instrument, called frequency counter, which allows measuring the working frequency of the original radio remote control, usually being few dozens or hundreds of MHz.

Once detected the working frequency of the original remote control to be duplicated, it is necessary to have available a programmable universal remote control having the same frequency and being capable to be programmed with the same radio code.

Although being relatively easy, the duplication operation is still left even nowadays to the skill of specialized operators.

However, sometimes, for security reasons, one would prefer to avoid having to request this service to a staff that is outside one's circle of close acquaintance.

Therefore, there is the need of being able to perform the duplication operation of a radio remote control independently, in an easy and quick way.

A possible known technical solution is described in US patent publication US 2008/068205. However, in that document there is described only a duplication mode of a radio remote control, which however does not allow automatically accrediting the new cloned radio remote control with the controlled electronic device.

The technical problem underlying the present invention is to conceive a method having such functional and structural characteristics as to allow duplicating an original remote control operating in radio frequency without needing to know anything about the receiver of radio frequency signals and even without needing to know the transmission protocols of the original remote control, which could have been manufactured by an unknown company or even being no more active in the sector.

This and other purposes must be able to be achieved with definitely reduced costs and with particularly simple operative modes, for example by means of a remote control having such structural and functional characteristics as to allow the realization of the above-mentioned method.

SUMMARY OF THE INVENTION

The appended claims may serve as a summary of the invention.

A solution idea underlying some embodiments is to provide for an apprenticeship step wherein the clone remote control is put listening a remote control to be duplicated; a recognition step of the working frequency and the code being transmitted by the original remote control to be duplicated, also in case of variable code, and a totally automatic storing control step, wherein the clone remote control initiates a recognition and accreditation procedure with the electrical device to be controlled, which, if it is permitted, stores also the new code of the clone remote control emulating the variable code of the original remote control to be duplicated.

Based on said solution idea, the technical problem is solved by a method of the previously described type and characterized by including the following steps:

- enabling the clone remote control to a duplication phase by pressing said control key and simultaneously pressing a programming key for a predetermined number of times;
- releasing the said control and programming keys;
- approaching the emitting ends of an original remote to be duplicated and the clone remote control in the duplicating phase;
- pressing for a predetermined period of time a key of the original remote control, allowing said microprocessor to receive via the transceiver the working frequency and the code transmitted from the original remote control by means of a recognition and/or emulation procedure of the transmitted code;
- pressing for a predetermined period of time a key of the clone remote control to which assign the same function of said key of the original remote control;
- storing in said memory said working frequency, the recognized code and the assigned key;
- starting an automatic storing procedure that provides for the transmission of predetermined sequences of recognized or emulated codes toward the electrical device to be controlled, said storing procedure automatically forcing the storing of the recognized or emulated code on a receiver of the electrical device to be controlled by generating alternating old and new codes being transmitted towards the electrical device to be controlled in a predetermined storing sequence; and
- repeating said storing procedure for a plurality of storing sequences being stored in said memory of said clone remote control until said clone remote control is recognized by said electrical device to be controlled.

In one embodiment, said predetermined number of times is equal to four.

The step of storing in memory the recognized or emulated codes is implemented in three phases:

a first phase wherein n duration measurements are carried out of the high-low and low-high transitions performed by the received radio signal;

a second step wherein said measurements are processed; and a third phase wherein a sampling of the code is carried out.

In the first measuring step, duration measurements are performed of n high-low and low-high transitions of the received radio signal obtaining the minimum and maximum duration values of these transitions. For the maximum duration of the transitions, the corresponding level of the radio signal is also stored.

In the second stage of processing, it is obtained the length of the period of the radio signal corresponding to the duration of the shorter transmission element, as well as the duration and the level of the pause corresponding to the duration and level of the longest transition.

In the third sampling phase the radio signal is sampled at different time instants, starting half a period after a transition and then continuing after each full period until the next transition from which it will be counted again half a period and so on.

It should be noted that the recognition procedure provides for the subsequent initiation of a storing step in case the recognized code is a fixed code or an emulation phase of a variable rolling-type code having a serial number different from the recognized code.

Moreover, the storing procedure provides for the initiation of a procedure that automatically forces the storage of the new emulated code on the receiver of the electrical device to be controlled, said procedure generating alternative new and old codes transmitted in a predetermined sequence.

The invention refers also a remote control comprising at least one control key or button, a memory, a transceiver and a microprocessor capable to execute a program in order to implement the previously described steps of the method.

In an embodiment, a clone remote control is programmed to remotely control an electrical device by pressure of at least one control key, the clone remote control comprising: a radio frequency transceiver; a microprocessor coupled to the microprocessor; at least one non-transitory data storage device coupled to the microprocessor and storing one or more sequences of instructions which, when executed by the microprocessor, cause the microprocessor to perform: enabling a duplication phase in response to input indicating pressing said control key and simultaneously pressing a programming key for a predetermined number of times; detecting releasing of the control key and the programming key; receiving the transceiver a working frequency and a code transmitted from an original remote control for a predetermined period of time, by means of a recognition and/or emulation procedure of the code that is transmitted; detecting third input indicating pressing for a predetermined period of time an assigned key of the clone remote control to which the same function of an original key of the original remote control is to be assigned; storing, in the memory: said working frequency, the recognized code and the assigned key; starting an automatic storing procedure that provides for transmission of predetermined sequences of recognized or emulated codes toward the electrical device, said storing procedure automatically forcing the storing of the recognized or emulated code on a receiver of the electrical device by generating alternating old and new codes and by controlled transmitting of the alternating old and new codes towards the electrical device in a predetermined storing sequence.

In one feature of this aspect, the clone remote control further comprises sequences of instructions in the memory which when executed by the microprocessor cause repeating said storing procedure to cause storing a plurality of storing sequences in the memory of the clone remote control until the clone remote control is recognized by the electrical device.

Characteristics and benefits of the method and the remote control of the present invention will be apparent from the following description of an exemplary embodiment given by way of non-limitative example with reference to the attached drawings.

DETAILED DESCRIPTION

Figure 1:
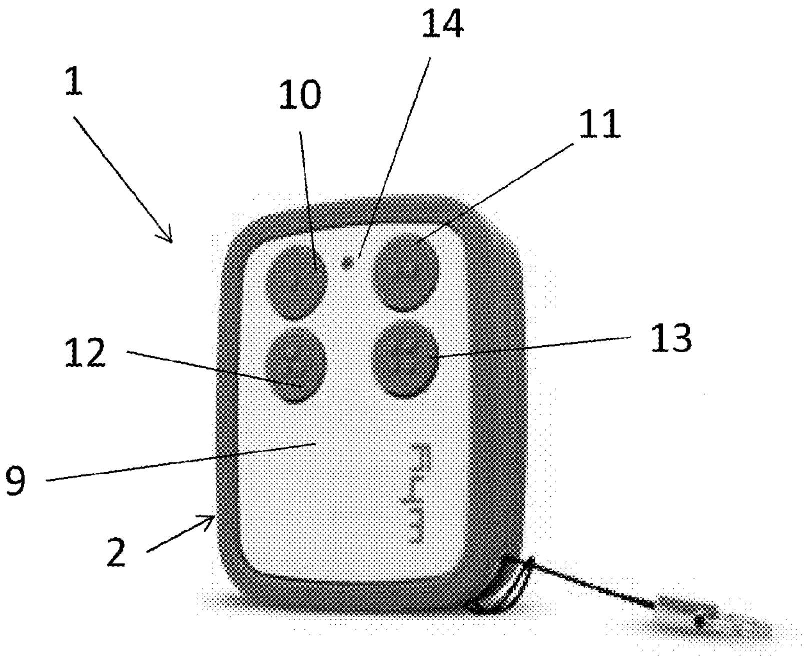
FIG. 1 shows a schematic and perspective view of a remote control being realized according to an embodiment.
Figure 2:
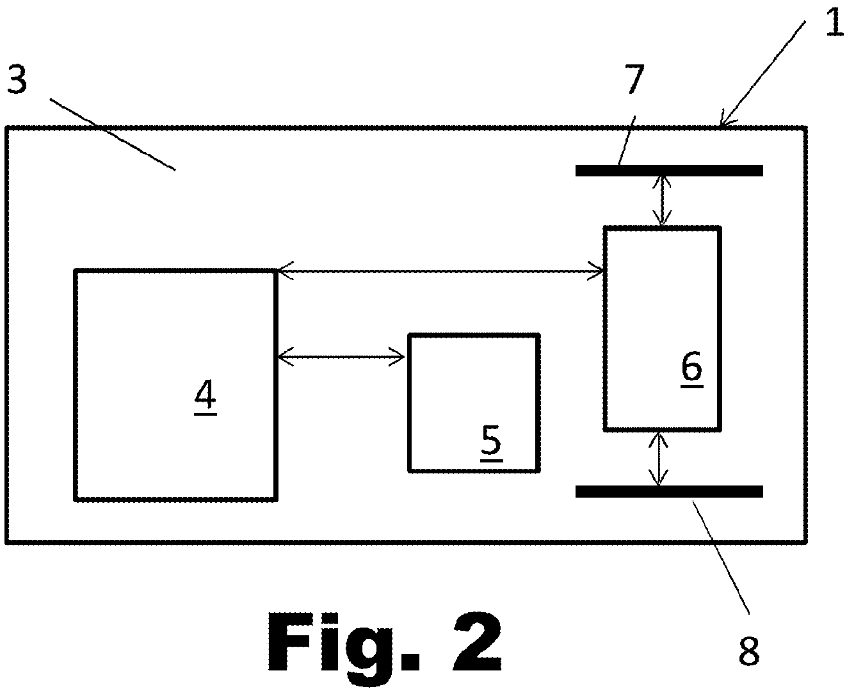
FIG. 2 shows a schematic view of the essential electronic circuitry embedded in the remote control of FIG. 1.

With reference to those figures, and particularly to the example of FIG. 1, a remote control is schematically shown as a whole with 1, which will be defined in the following as "clone", being realized according to an embodiment by duplicating an original remote control.

The clone remote control 1 includes a casing 2 being essentially parallelepiped-shaped with rounded corners and having a reduced thickness. The casing 2 contains and protects an electronic circuitry 3 including a microprocessor 4, a memory 5, a transceiver 6 and a pair of antennas 7 and 8. More particularly, the memory 5 is integrated in the microprocessor 4.

The double antenna has the benefit of increasing the radio frequency range and thus the effective action distance with respect to the controlled device.

All the electronic circuitry 3 is supplied by a small direct current battery being inserted in the casing 2, but not represented in the drawings because conventional.

On the visible surface 9 of the casing 2 there are arranged few buttons among which: a control key or button 10, in order to control a main electrical device, a second programming key or button 11 and a third and fourth button 12, 13 in order to optionally control further electrical devices.

On each of the four keys o buttons, there is a corresponding embossed character in braille code, which eases its identification with the touch alone.

A signaling LED 14, being connected to the operation of the remote control 1 is also provided for.

The remote control 1 operates in radio frequency and, for this reason, in the following description it will be referred to using the term radio remote control.

The remote control 1 can also be defined as "universal", since it is capable to be used with a plurality of electrical devices to be controlled, particularly for a domotic use. Moreover, the remote control 1 is able to emulate the original remote controls being realized by a plurality of manufacturing companies, independently from their internal structure.

In one embodiment, the clone remote control is structured in order to automatically force the storing of his codes on the receiver of the main controlled electrical device, but without a direct intervention on that receiver.

More particularly, the emulation of the original remote control occurs after a learning procedure of the code of the original remote control, which in the following will be called copy procedure.

There are fixed code remote controls, namely transmitting the same code every pressing of the control key; for them the emulation occurs by making an exact copy of the radio code, characterized by the radio signal, the modulation e the working frequency.

Instead, for the original variable code remote controls, namely those remote controls that change the transmitted code every pressing of the control key, the emulation of the original remote control occurs by making a similar copy of the radio code, being characterized by the same modulation and working frequency, but by a partially different radio code.

The method according to an embodiment initially provides for a procedure to be executed in order to put the clone remote control in "listening" mode and thus to be able to transmit to the clone remote control the same code and the same working frequency of the original remote control to be duplicated. The replication procedure as a whole is innovative with respect to the similar products currently on the market and is extremely more simple and comfortable for the user.

A benefit of an embodiment is that it allows working with both free hands. Actually, in a different way from all the other solutions being proposed in the known art, after pressing the keys in the exact sequence provided for in the cloning step, the user can release all the keys without being forced to keep the "destination" key pressed, namely the key of the clone remote control which will duplicate the control function carried out by the original remote control to be duplicated.

In this way, it is possible to carry out all the duplication operation in a much more practical way and to decide for example on which key of the clone remote control to store the code being learnt during the duplication, by pressing the related key at the end of the procedure.

According to the method of an embodiment, now it is possible to see which steps are to be carried out in order to activate the copy procedure.

Firstly, it was chosen to enable the copy procedure by asking the user to keep two keys pressed at the same time. More particularly, while keeping the top left control key 10 pressed, the second top right programming key 11 must be pressed for a preset number of times on the remote control 1.

The preset number of times has been chosen equal to four in order to avoid the accidentally start and enabling of the copy procedure. Other keys combinations are used in order to enable more specific copy procedures, which will be described later.

After releasing both the buttons 10 and 11, and activating the copy procedure, the LED 14 of the remote control 1 starts flashing slowly. At this point, the emitting end of an original remote control to be copied and the emitting end of the clone remote control of an embodiment must be put near to each other and the desired key of the original remote control which is to be copied must be pressed.

In this first step, the clone remote control searches the frequency of the original remote control for about thirty seconds, while the LED 14 flashes slowly. After finding the working frequency, the code of the original remote control is stored by means of a code writing method being described in the following; at this point, the LED 14 starts flashing quickly in order to show that the code has been learnt.

Therefore, it is necessary to push the key of the clone remote control where it is desired to store said code. Not necessarily that key corresponds in number and order to the one of the original remote control.

Figure 3:
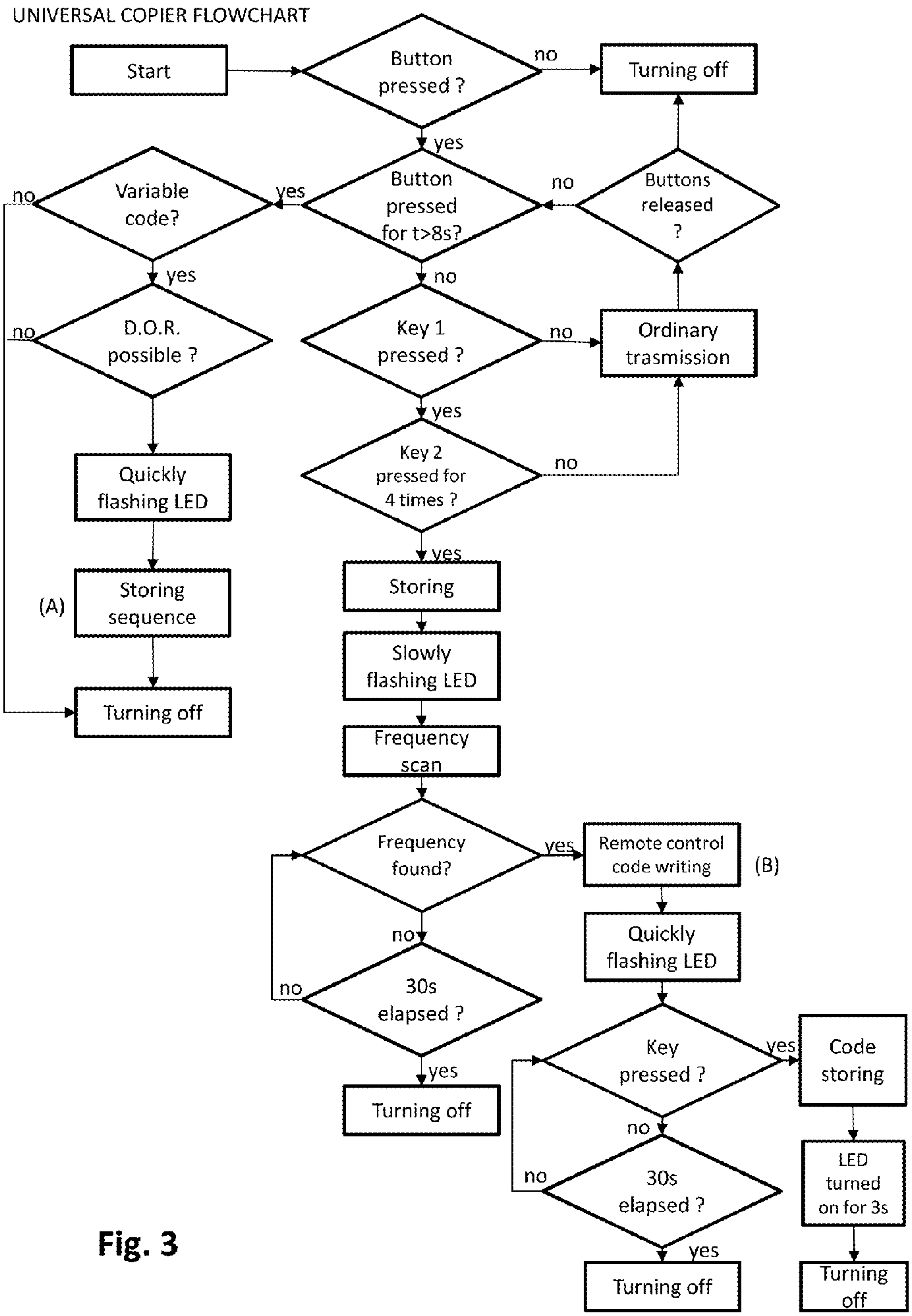
FIG. 3 shows a view of a flowchart illustrating the steps of the method of an embodiment.

All the procedure is illustrated in detail in the flowchart of FIG. 3.

In few cases, the remote control under consideration needs other information corresponding to a further pressing of the key of the original remote control or any other special key of the original remote control. In this case, the LED will flash with a double flashing in order to signal the request for a further pressing.

For few original variable code remote controls, the clone remote control is able to recognize the type of variable code, and for these remote controls, the remote control 1 will generate a similar code to be stored directly or with an automatic procedure in the memory 5 being associated to the receiver 6. The variable codes generation occurs by means of proper algorithms being specific to each type of code. In all the other cases, it will be done an identical copy of the original code.

Now, there will be described more in particular the modes by which the method of an embodiment provides for writing the variable code acquired from the original remote control in the memory 5.

The mode substantially occurs in three steps.

In a first phase, n duration measurements are carried out of the high-low and low-high transitions performed by the received radio signal; in a second step, those measurements are processed and in a third phase a sampling of the code is carried out.

In the first measuring step, duration measurements are performed of n high-low and low-high transitions of the received radio signal; in this way the minimum and maximum duration values of these transitions are obtained. For the maximum duration of the transitions, the corresponding level of the radio signal is also stored.

In the second stage of processing, it is obtained the length of the period of the radio signal corresponding to the duration of the shorter transmission element. Moreover, the duration and the level of the pause corresponding to the duration and level of the longest transition is obtained.

In the third sampling phase the radio signal is sampled at different time instants, starting half a period after a transition and then continuing after each full period until the next transition from which it will be counted again half a period and so on.

Once obtained the samples sequence, it will be possible to recognize a known code called rolling-code, in order to realize a similar code, different in the serial number, or, on the contrary, it will be stored the code as it is.

Figure 4:
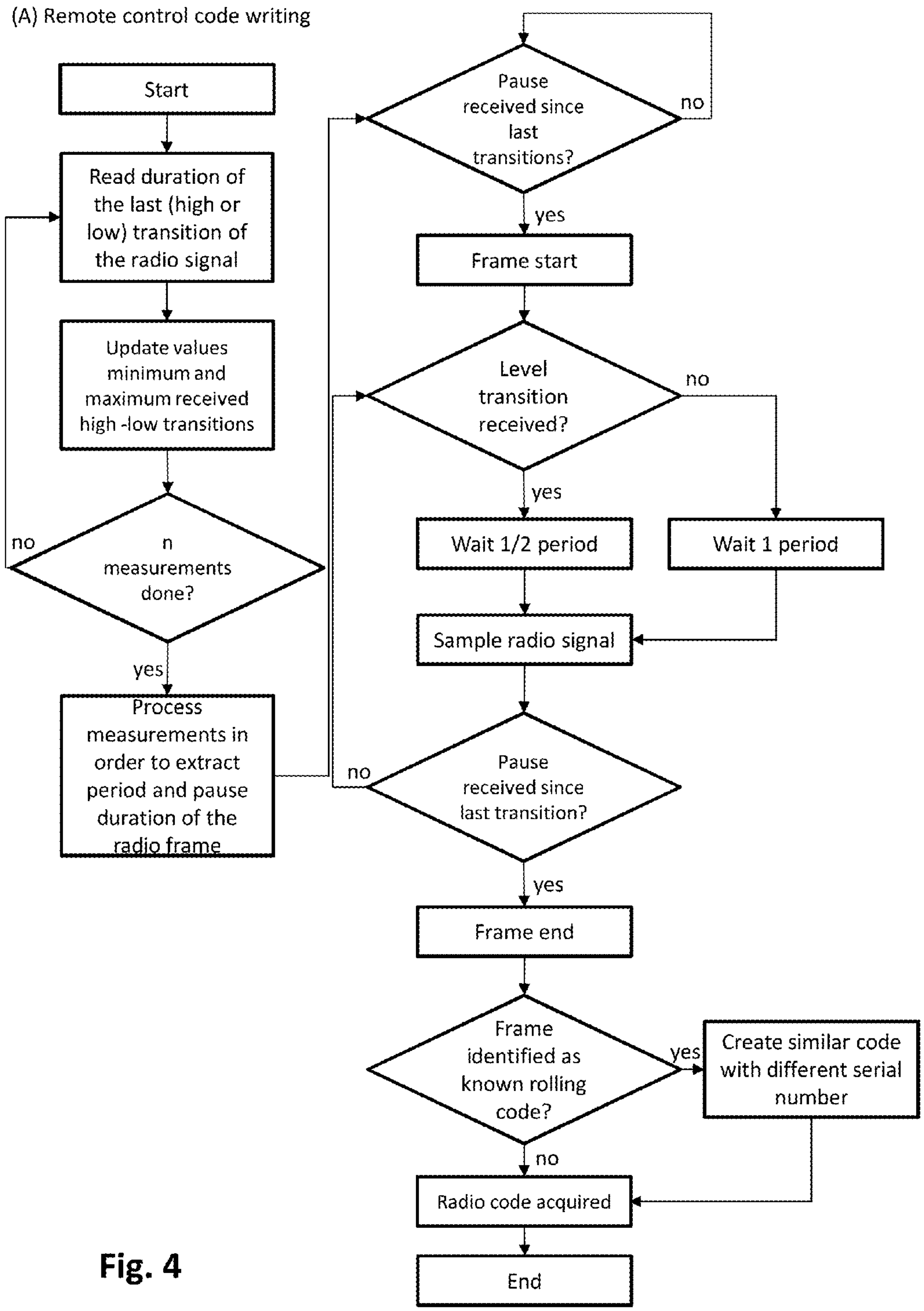
FIG. 4 shows a further flowchart illustrating further realization steps of the method of an embodiment.

All the procedure of recognizing and writing in memory the duplicate code is shown in detail in the flowchart of FIG. 4.

By pressing the key 10 of the remote control 1 where the duplicate radio code has been stored, it is obtained its ordinary transmission if the pressing time is less than eight seconds.

If instead the pressing time exceeds the eight seconds, the remote control 1 is programmed to turn off if the code is of a fixed or variable type that does not allow the automatic storing. The automatic storing procedure takes place if the code is of a variable type that allows the automatic storing.

Now, the automatic code storing procedure is described more in particular.

For the original variable code remote controls, the clone remote control 1 generates a code similar to the original, which is stored in the memory 5. This code must be stored also in the memory of the receiver of the controlled electrical device.

Actually, it is not possible to use the same code of the original remote control, because the two remote controls would interfere.

Figure 5:
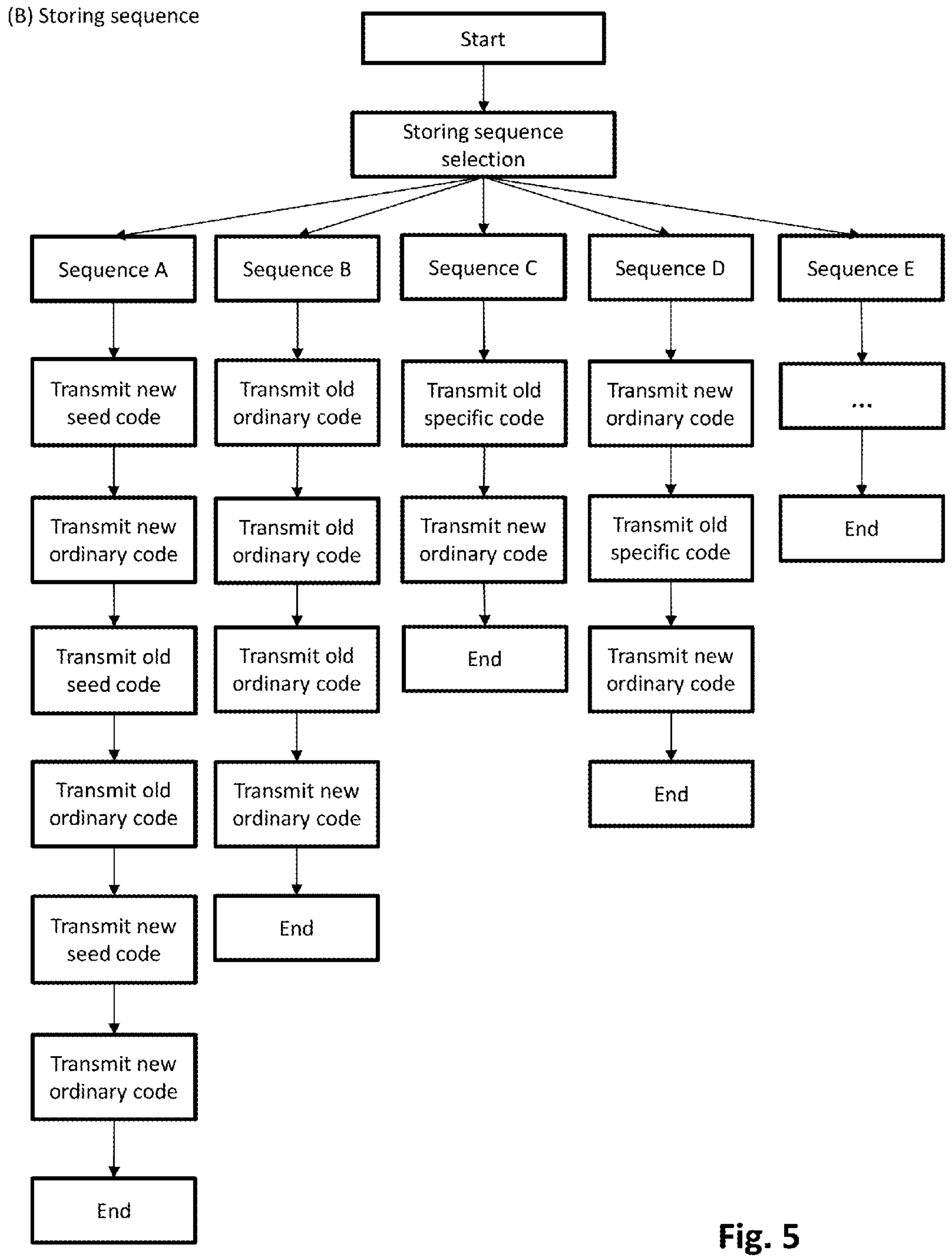
FIG. 5 shows a view of a flowchart illustrating a particular code storing phase according to the method of an embodiment.

If the receiver of the controlled electrical device allows it, the storing procedure can automatically force the storing of the new code on the receiver, by generating for that purpose alternating old and new codes being transmitted in a sequence, called storing sequence, which is shown by way of example in the flowchart of FIG. 5.

The alternating old and new codes allow the receiver to understand that the sequence of received signals does not represent an ordinary activation command, but a sequence for programming and storing the new alternate variable code similar to the cloned code.

The storing sequence is activated by keeping the key 10 of the remote control under consideration pressed for eight seconds. The LED starts to flash quickly and the storing sequence is transmitted, after which the remote control turns off.

At this point, the variable code is stored also on the receiver of the controlled device.

Now, turning back to the recognizing procedure of the code called rolling-code, being previously outlined, it is appropriate to underline that it is a completely automatic procedure being carried out by the clone remote control 1.

More particularly, it is a function that allows the new universal clone radio remote control 1 to perform alone all the operative steps needed to be able to be recognized, and therefore used, by the electrical devices to be controlled.

As already mentioned, in contrast to the old and simpler fixed codes, the new generation remote controls use variable codes and almost all the remote control manufacturers use "Rolling-codes", which instead of replicating the same code each time the control key is pressed, emit a totally different one generated by an algorithm being preset on both the transmitter and the respective receiver.

In order to being able to duplicate a radio remote control operating with these modes, it would be necessary to perform a storing procedure on the receiver of the controlled electrical device that varies depending on the manufacturer.

Therefore, the clone remote control of an embodiment includes a series of algorithms reproducing the storing sequences of the cloned variable codes for almost all the remote control manufacturers. Those sequences are automatically timed and executed each time a duplication is carried out of an original remote control using variable codes during transmission.

In other words, the sequence of steps shown in the flowchart of FIG. 5 is repeated for a series of sequences stored in the clone remote control 1 so that pressing the key being previously programmed according to the method of an embodiment, the step is autonomously activated which forces the storing of the new codes similar to those of the original remote control on the receiver of the controlled device.

Substantially, the clone remote control 1 continuously sends information being useful for its identification, and consequent use, based on the storing sequences contained in its memory and corresponding to almost all the remote control manufacturers.

In this way, errors by the final user are avoided and the accreditation step of the new clone remote control 1 with each electrical device to be controlled is much simplified.

It is clear that this fully automatic mode allows solving a problem that is considered as an obstacle when the identification function of the new clone remote control is managed by people that are totally lacking knowledge about the subject.

Thanks to this function, the final user must not know and be able to correctly carry out the insertion procedures in the respective receiver anymore. Until today, the difficulty was caused by each manufacturer applying its procedures, which are always different from brand to brand. With this innovation instead, they are perfectly and fully automatically and autonomously executed by the clone remote control, being unified in a single and simple prolonged pressing of the proper key.

The invention claimed is:

1. Duplication method for a clone remote control (1) operating in radio frequency and capable to remotely control an electrical device by the pressure of at least one control key or button (10); said remote control comprising at least one memory (5), a transceiver (6) and a microprocessor (4) capable of executing a program for implementing the following steps:

enabling the clone remote control (1) to a duplication phase of said by pressing said control key (10) and simultaneously pressing a programming key (11) for a predetermined number of times;

releasing the said keys (10, 11);

approaching the emitting ends of an original remote to be duplicated and the clone remote control (1) in the duplicating phase;

pressing for a predetermined period of time a key of the original remote control, allowing said microprocessor (4) to receive via the transceiver (6) the working frequency and the code transmitted from the original remote control by means of a recognition and/or emulation procedure of the transmitted code;

pressing for a predetermined period of time a key of the clone remote control (1) to which assign the same function of said key of the original remote control;

storing in said memory (5) said working frequency, the recognized code and the assigned key;

starting an automatic storing procedure that provides for the transmission of predetermined sequences of recognized or emulated codes toward the electrical device to be controlled, said storing procedure automatically forcing the storing of the recognized or emulated code on a receiver of the electrical device to be controlled by generating alternating old and new codes being transmitted towards the electrical device to be controlled in a predetermined storing sequence; and repeating said storing procedure for a plurality of storing sequences being stored in said memory (5) of said clone remote control (1) until said clone remote control (1) is recognized by said electrical device to be controlled.

2. Method according to claim 1 wherein said predetermined number of times is equal to four.

3. Method according to claim 1 in which an LED (14) of the clone remote control (1) clone flashes both during the storage phase of the transmitted code or during the assignment phase of the key having the same function, but with different flashing frequencies.

4. Method according to claim 1 wherein said step of storing in memory the recognized or emulated codes is implemented in three phases:

a first phase wherein n duration measurements are carried out of the high-low and low-high transitions performed by the received radio signal;

a second step wherein these measurements are processed; and a third phase wherein a sampling of the code is carried out.

5. Method according to claim 4 wherein in said first measuring step duration n measurements are performed of the high-low and low-high transitions of the received radio signal obtaining the minimum and maximum duration values of these transitions.

6. Method according to claim 5 wherein for the maximum duration of the transitions the corresponding level of the radio signal is also stored.

7. Method according to claim 4 wherein in said second stage of processing it is obtained the length of the period of the radio signal corresponding to the duration of the shorter transmission element, as well as the duration and the level of the pause corresponding to the duration and level of the longest transition.

8. Method according to claim 4 wherein in said third sampling phase the radio signal is sampled at different time instants, starting half a period after a transition and then continuing after each full period until the next transition from which it will be counted again half a period and so on.

9. Method according to claim 1 wherein said recognition procedure provides for the subsequent initiation of a storing step in case the recognized code is a fixed code or an emulation phase of a variable rolling-type code having a serial number different from the recognized code.

10. Method according to claim 1, wherein said step of initiating said storing procedure is started by keeping said control key (10) pressed for a predetermined period of time.

11. Method according to claim 1, wherein said repeated storing sequences correspond to storing sequences of all the remote control manufacturers.

12. Remote control (1) comprising at least one control key or button (10), a memory (5), a transceiver (6), a pair of antennas (7, 8) associated to said transceiver (6) and a microprocessor (4) being capable to execute a computer program in order to implement the method steps of claim 1.

13. Remote control (1) according to claim 12, characterized by further including a programming key (11), a third key (12) and a fourth key (13) in order to optionally control further electrical devices.

14. Remote control (1) according to claim 12, characterized in that said memory (5) includes a plurality of storing sequences corresponding to storing sequences of all the remote control manufacturers.

15. A clone remote control programmed to remotely control an electrical device by pressure of at least one control key, the clone remote control comprising:

a radio frequency transceiver;

a microprocessor coupled to the microprocessor;

at least one non-transitory data storage device coupled to the microprocessor and storing one or more sequences of instructions which, when executed by the microprocessor, cause the microprocessor to perform:

enabling a duplication phase in response to input indicating pressing said control key and simultaneously pressing a programming key for a predetermined number of times;

detecting releasing of the control key and the programming key;

receiving the transceiver a working frequency and a code transmitted from an original remote control for a predetermined period of time, by means of a recognition and/or emulation procedure of the code that is transmitted;

detecting third input indicating pressing for a predetermined period of time an assigned key of the clone remote control to which the same function of an original key of the original remote control is to be assigned;

storing, in the memory: said working frequency, the recognized code and the assigned key;

starting an automatic storing procedure that provides for transmission of predetermined sequences of recognized or emulated codes toward the electrical device, said storing procedure automatically forcing the storing of the recognized or emulated code on a receiver of the electrical device by generating alternating old and new codes and by controlled transmitting of the alternating old and new codes towards the electrical device in a predetermined storing sequence.

16. The clone remote control of claim 15, further comprising sequences of instructions in the memory which when executed by the microprocessor cause repeating said storing procedure to cause storing a plurality of storing sequences in the memory of the clone remote control until the clone remote control is recognized by the electrical device.

17. The clone remote control of claim 15, further comprising sequences of instructions in the memory which when executed by the microprocessor cause driving a light-emitting diode (LED) of the clone remote control to flash both during the storage phase and during the assignment phase using two different flashing frequencies.

18. The clone remote control of claim 15, further comprising sequences of instructions in the memory which when executed by the microprocessor cause storing the recognized or emulated codes in three phases of execution comprising:

a first phase wherein a specified number of duration measurements is performed to measure high-low and low-high transitions of the received radio signal;

a second step wherein the duration measurements are processed; and a third phase wherein a sampling of the code is carried out.

19. The clone remote control of claim 15, further comprising sequences of instructions in the memory which when executed by the microprocessor cause: after the recognition procedure, performing a storing step when the recognized code is a fixed code or an emulation phase of a variable rolling-type code having a serial number different from the recognized code.

* * * * *